(No Model.)

H. A. BERNARD HUGUET DE VARS.
OZONE APPARATUS.

No. 409,903. Patented Aug. 27, 1889.

WITNESSES:
Edward Wolff
William Miller

INVENTOR:
Hilarion Antoine Bernard Huguet de Vars.
BY
Van Santvoord & Hauff
his ATTORNEYS

UNITED STATES PATENT OFFICE.

HILARION ANTOINE BERNARD HUGUET DE VARS, OF PARIS, FRANCE.

OZONE APPARATUS.

SPECIFICATION forming part of Letters Patent No. 409,903, dated August 27, 1889.

Application filed April 6, 1889. Serial No. 306,277. (No model.)

*To all whom it may concern:*

Be it known that I, HILARION ANTOINE BERNARD HUGUET DE VARS, a citizen of France and a resident of Paris, France, have invented certain Improvements in an Ozone-Producing Apparatus, of which the following is a specification.

My invention relates to an apparatus for producing ozone by an entirely new process. In order to make my invention more clearly understood I shall now refer to the accompanying drawings, in which—

Figure 1:
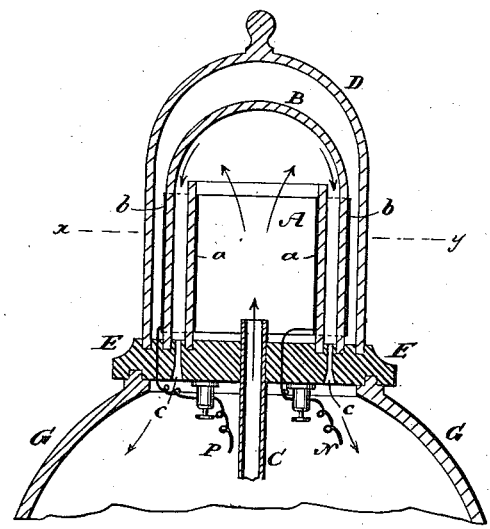
Figure 2:
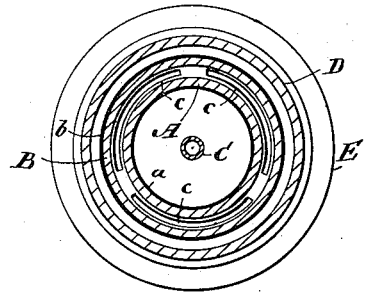

Figure 1 is a vertical section of my ozone apparatus; and Fig. 2, a top view of the apparatus at the line $x\ y$, Fig. 1.

The same letters of reference indicate corresponding parts in both figures.

My ozone-producing apparatus consists—

First. Of an ebonite stand E, in which circular grooves are contrived to fit and receive the lower circumference of a glass cylinder and those of two concentric bell-covers.

Second. Of a glass cylinder A, the inner surface of which is covered with tin-foil $a$.

Third. Of a glass bell-cover B, the outer surface of which is covered with tin-foil $b$. The bell-cover B and the cylinder A fit in the circular grooves of the ebonite stand E, a distance of five millimeters separating the grooves. The sheets of tin-foil $a$ and $b$ are connected with an induction-coil by means of conducting-wires P N. Attention is called to the fact that the electricity is produced by an induction-coil. The wire P communicates with the positive pole of the induction-coil. The wire N communicates with the negative pole of the induction-coil.

Fourth. A glass bell-cover D insulates and covers the whole.

Fifth. Between the grooves in which the cylinder A and the bell-cover B rest there are openings $c$, intended solely to allow the ozonized air to pass as fast as it is produced into the nickel-plated receiver G, where it is stored.

Sixth. The tube C, which passes through the ebonite stand E, brings the air forced along by a ventilator into the bell-cover B. This stream of air strikes against the top of the bell-cover B, and is obliged to pass between the bell-cover B and the cylinder A. If at this instant the induction-coil is set in operation the inductive electricity passes through the two wires P N, and the fluid, seeking its equilibrium, meets with a resistance in the thickness of the glass, which causes the electricity to be reconstituted in the form of feeble sparks on the surface covered with tin-foil—that is to say, on all that part of the outer surface of the cylinder A corresponding to the part of its inner surface covered with tin-foil $a$, as also on all that part of the inner surface of the bell-cover B corresponding to the part of its outer surface covered with tin-foil $b$.

The oxygen of the electrified air then changes into ozone.

What I claim as my invention, and desire to secure by Letters Patent, is—

1. In an ozone-producing apparatus, the combination of a receiver G, for the storage of the air, the stand E, having openings $c$, which communicate with the receiver, a cylinder A, mounted at one end on the stand, open at the opposite end and lined with foil $a$, the bell-cover B, inclosing the cylinder, mounted on the stand and lined with foil $b$, said cylinder and bell-cover being arranged with the openings in the stand between them, and wires N P, connecting the cylinder and bell-cover with an electric generator, substantially as described.

2. In an ozone-producing apparatus, the combination of an ebonite or other suitable stand E, provided with openings in the part between the grooves in which the cylinder A and the bell-cover B respectively fit, such openings being intended to convey the air into the receiver G to be stored, a tube C, passing through the ebonite or other stand, a glass bell-cover D, covering the whole, and wires N P, connecting the cylinder and bell-cover with an electric generator, substantially as described.

3. In an ozone-producing apparatus, the combination of an ebonite or other suitable stand E with a cylinder A, the inner surface of which is covered with tin-foil $a$, connected by a wire N with the negative pole of an induction-coil, and a bell-cover B, the outer surface of which is covered with tin-foil $b$, connected by a wire P with the positive pole of an induction-coil, substantially as described and set forth.

In testimony whereof I have signed my name to this specification in the presence of two subscribing witnesses.

HILARION ANTOINE BERNARD HUGUET DE VARS.

Witnesses:
G. LOMBARD,
CH BROWN.